United States Patent
Yamakawa (10) Patent No.: US 11,173,748 B2
(45) Date of Patent: Nov. 16, 2021

(54) PNEUMATIC TIRE

(71) Applicant: The Yokohama Rubber Co., LTD., Tokyo (JP)

(72) Inventor: Takahiro Yamakawa, Hiratsuka (JP)

(73) Assignee: The Yokohama Rubber Co., Ltd.

( * ) Notice: Subject to any disclaimer, the term of this patent is extended or adjusted under 35 U.S.C. 154(b) by 342 days.

(21) Appl. No.: 16/070,243

(22) PCT Filed: Jan. 12, 2017

(86) PCT No.: PCT/JP2017/000872
§ 371 (c)(1),
(2) Date: Jul. 13, 2018

(87) PCT Pub. No.: WO2017/122742
PCT Pub. Date: Jul. 20, 2017

(65) Prior Publication Data
US 2019/0016179 A1    Jan. 17, 2019

(30) Foreign Application Priority Data

Jan. 14, 2016 (JP) .............................. JP2016-004939

(51) Int. Cl.
*B60C 11/01* (2006.01)
*B60C 3/04* (2006.01)
(Continued)

(52) U.S. Cl.
CPC ............. *B60C 11/01* (2013.01); *B60C 3/04* (2013.01); *B60C 11/0306* (2013.01);
(Continued)

(58) Field of Classification Search
CPC . B60C 11/01; B60C 11/0306; B60C 11/1204; B60C 11/1236; B60C 3/04;
(Continued)

(56) References Cited

U.S. PATENT DOCUMENTS

| 5,571,351 A | 11/1996 | Hatakenaka et al. |
| 5,605,588 A | 2/1997 | Hatakenaka et al. |
| 2018/0065415 A1* | 3/2018 | Sakamoto ............... B60C 11/01 |

FOREIGN PATENT DOCUMENTS

| JP | H06-344723 | 12/1994 |
| JP | 11291718 A * | 10/1999 |

(Continued)

OTHER PUBLICATIONS

Masaharu Ono, JP-11291718-A, machine translation. (Year: 1999).*
(Continued)

*Primary Examiner* — Robert C Dye
*Assistant Examiner* — Sedef E Paquette
(74) *Attorney, Agent, or Firm* — Thorpe North & Western (57) ABSTRACT

A pneumatic tire includes: a main groove extending in a tire circumferential direction disposed on a shoulder region of a tread portion; lug grooves extending from the main groove toward an outer side and reaching a side wall portion; and blocks demarcated by the main groove and lug grooves. An edge on an innermost side in a tire radial direction of the blocks is positioned more on an outer side in the tire radial direction than a tire maximum width position, and a ratio of an orthogonal distance from a ground contact end position to the edge on an innermost side in the tire radial direction of the blocks is 0.2 or more. Recessed portions each having a closed periphery are provided in a side region more on an outer side in a tire width direction than the ground contact end of the blocks.

11 Claims, 5 Drawing Sheets

(51) Int. Cl.
*B60C 11/03* (2006.01)
*B60C 11/12* (2006.01)

(52) U.S. Cl.
CPC ...... *B60C 11/1204* (2013.01); *B60C 11/1236* (2013.01); *B60C 2011/013* (2013.01); *B60C 2011/036* (2013.01); *B60C 2011/0348* (2013.01); *B60C 2011/0365* (2013.01); *B60C 2011/1213* (2013.01); *B60C 2200/14* (2013.01)

(58) Field of Classification Search
CPC ....... B60C 2011/013; B60C 2011/0348; B60C 2011/036; B60C 2011/0365; B60C 2011/039; B60C 2011/0395; B60C 2011/1213; B60C 2200/14; B60C 13/02
USPC ..................................................... 152/209.16
See application file for complete search history.

(56) References Cited

FOREIGN PATENT DOCUMENTS

| | | |
|---|---|---|
| JP | 2003-237318 | 8/2003 |
| JP | 2005306258 A * | 11/2005 |
| JP | 2011-183884 | 9/2011 |
| JP | 2013-216146 | 10/2013 |

OTHER PUBLICATIONS

Toshihiko Takahashi, JP-2005306258-A, machine translation. (Year: 2005).*

International Search Report for International Application No. PCT/JP2017/000872 dated Apr. 18, 2017, 4 pages, Japan.

* cited by examiner

PNEUMATIC TIRE

TECHNICAL FIELD

The present technology relates to a pneumatic tire, and particularly relates to a pneumatic tire that can achieve excellent running performance on muddy ground, snowy roads, sandy ground, or the like.

BACKGROUND ART

A pneumatic tire with a tread pattern primarily having a lug groove with a high amount of edge components, and with a large groove area or groove depth is generally used for a pneumatic tire used in traveling on muddy ground, snowy roads, sandy ground, and the like (hereinafter, referred to as muddy ground or the like). With this tire, traction performance is achieved by engaging with mud, snow, sand, and the like (hereinafter, referred to as mud and the like) on a road surface, and mud and the like is prevented from packing into the groove (discharging performance of mud and the like is increased), and thus running performance on muddy ground and the like (mud performance) is improved (for example, refer to Japanese Unexamined Patent Application Publication No. 2011-183884).

In particular, with the technology according to Japanese Unexamined Patent Application Publication No. 2011-183884, when traveling on muddy ground and the like, attention is given to a region from a shoulder portion to a sidewall portion also engaging with mud and the like, a lug groove extending to an outer side in a tire width direction on the shoulder portion further extends past the shoulder portion until the sidewall portion, and a groove width of the lug groove increases in size toward an outer side in the tire width direction. With the tire, when traveling on muddy ground and the like, the mud performance can be further improved by a lug groove extending past the shoulder portion to an outer side in the tire width direction.

However, with a lug groove having this shape, discharging performance of mud and the like is achieved by increasing the size of the groove width toward the outer side in the tire width direction, and therefore, mud and the like in the lug groove is rather difficult to compact, and a problem occurs where traction properties occurring due to shear force with regard to mud and the like compacting in the lug groove is insufficient. Therefore, a problem occurs where high traction properties cannot be ensured particularly if emergency vehicle movement must be started such as when a tire enters deep muddy ground or the like.

SUMMARY

The present technology relates to a pneumatic tire that can achieve excellent running performance on muddy ground, snowy roads, sandy ground, or the like.

A pneumatic tire of the present technology includes: an annular-shaped tread portion extending in a tire circumferential direction; a pair of sidewall portions disposed on both sides of the tread portion; a pair of bead portions disposed on an inner side in a tire radial direction of the sidewall portions; a main groove extending in the tire circumferential direction disposed on a shoulder region of the tread portion; a plurality of lug grooves extending from the main groove toward an outer side of a tire width direction and reaching the side wall portion; and a plurality of blocks being demarcated by the main groove and lug grooves; wherein for the blocks, an edge on an innermost side in the tire radial direction is positioned more on an outer side in the tire radial direction than a tire maximum width position, and a ratio h/H of an orthogonal distance h from a ground contact end position of the tread portion to the edge on an innermost side in the tire radial direction measured toward the tire radial direction with regard to a tire cross-sectional height H is 0.2 or more; the blocks are provided with a plurality of recessed portions each having a closed periphery in a side region more on an outer side of the tire width direction than the ground contact end of the tread portions; and a ratio of Sin/Sout of a total area Sin of the plurality of recessed portions for each of the blocks and an area Sout of the side region for each of the blocks satisfies a relationship of $0.2 \leq Sin/Sout \leq 0.6$.

In the present technology, the plurality of recessed portion having a closed periphery is provided in the side region of the shoulder block, and therefore, when traveling on deep muddy ground or the like, mud and the like can be grasped and compacted by the recessed portions. As a result, excellent traction properties can be ensured based on a shear force with regard to the compacted mud or the like. At this time, the block greatly extends to the inner side in the tire radial direction, and the plurality of recessed portions are formed more on the outer side than the ground contact end, and therefore, when the tire enters deep muddy ground or the like, the tire can widely use a portion contacting mud and the like to enhance traction properties. Furthermore, the total area of the plurality of recessed portions is set to an appropriate size with regard to the area of the side region, and therefore, traction properties can be effectively enhanced while sufficiently ensuring block rigidity. Note that in the present technology, areas Sin and Sout are values measured on a block surface.

In the present technology, a maximum protruding amount of the block from a groove bottom of the lug groove is preferably 1.5 mm or more on an inner side in the tire radial direction than a center position in the tire radial direction of the side region. Thereby, the block can sufficiently protrude even in a region separated to the inner side in the tire radial direction from the tread portion, which is advantageous in enhancing traction performance.

In the present technology, a depth of the recessed portion is preferably 0.5 mm or more, and preferably shallower than a groove depth of a portion of the lug groove adjacent in a circumferential direction with regard to the recessed portion. Thereby, a volume of the recessed portion can be sufficiently ensured, which is advantageous in achieving traction properties based on a shear force with regard to the compacted mud or the like.

In the present technology, of the lug grooves, at least a portion of the lug grooves preferably includes a narrow width bent portion bent with regard to an extending direction of the lug groove in conjunction with having a smaller groove width than another portion of the lug grooves. By providing the narrow width bent portion, discharging of mud and the like in the shoulder lug groove having the narrow width bent portion to the outer side in the tire width direction can be suppressed, and the mud and the like in the shoulder lug groove can be easily compacted in the lug groove, and thus excellent traction properties can be ensured based on a shear force with regard to the compacted mug or the like, even in the lug groove.

If the narrow width bent portion is provided, a shoulder lug groove having the narrow width bent portion and a shoulder lug groove not having the narrow width bent portion are preferably alternatingly disposed along the tire circumferential direction. Based on this placement, a lug groove having excellent discharging performance of mud and the like due to having a sufficient groove width to an end portion on the outer side in the tire width direction, and a lug groove having excellent traction properties based on a shear force with regard to compacted mud and the like due to having the narrow width bent portion are uniformly disposed in the tire circumferential direction, and thus these performances are both established with favorable balance, thus tire performance can be effectively demonstrated to match conditions when traveling.

In the present technology, a ratio Wb/Wa of a groove width Wa of the lug groove at an initial position of the narrow width bent portion and groove width Wb on the narrow width bent portion, when the lug groove having the narrow width bent portion is viewed from a tire equator side, is preferably 0.15 to 0.50. By setting the groove width of the narrow width bent portion with regard to a portion other than the narrow width bent portion in this manner, discharging performance of mud and the like based on the narrow width bent portion and traction properties based on a shear force with regard to compacted mud and the like can both be established with favorable balance.

Furthermore, if a narrow width bent portion is provided, a ratio A/H of an orthogonal distance A from a ground contact end position of the tread portion to the narrow width bent portion measured toward the tire radial direction with regard to the tire cross-sectional height H is preferably 0.05 to 0.3. By disposing the narrow width bent portion in this manner, mud and the like on a road surface is reliably in contact up to the narrow width bent portion when traveling on muddy ground or the like, and therefore, an effect based on the narrow width bent portion can be sufficiently demonstrated.

Furthermore, if a narrow width bent portion is provided, a stepwise protruding and recessed portion rising along a surface of the blocks on a portion of the blocks positioned on both sides in the tire circumferential direction of the lug groove having the narrow width bent portion is preferably provided. By providing the protruding and recessed portion in this manner, mud and the like packed in the lug groove can be effectively discharged through the protruding and recessed portion when normally traveling, and the discharging performance of the mud and the like can be improved.

At this time, a ratio B/H of an orthogonal distance B from a ground contact end position of the tread portion to the stepwise protruding and recessed portion measured toward the tire radial direction with regard to the tire cross-sectional height H is preferably 0.01 to 0.1. By disposing the stepwise protruding and recessed portion in this manner, mud and the like on a road surface is reliably contacted up to the stepwise protruding and recessed portion when traveling on muddy ground or the like, and therefore, an effect based on the stepwise protruding and recessed portion can be sufficiently demonstrated.

Furthermore, if a narrow width portion is provided, the plurality of recessed portions are preferably disposed in line in the tire radial direction, and at least a recessed portion on an innermost side in the tire radial direction is preferably adjacent in the circumferential direction with the narrow width bent portion. By disposing the recessed portion and narrow width bent portion in this manner, a complex recess and protrusion based on the recessed portion and narrow width bent portion is formed in a region separated from the tread portion, which is advantageous in enhancing traction properties.

At this time, a step extending across an entire circumference of the tire along the tire circumferential direction is preferably provided such that the recessed portion on an innermost side in the tire radial direction and the narrow width bent portion are divided. By providing the step in this manner, a complex protruding and recessed shape can be formed in a region separated from the tread portion, and mud and the like are easily engaged, which is advantageous in enhancing traction properties.

If a step is provided in this manner, a ratio C/H of an orthogonal distance C from a ground contact end position of the tread portion to the step measured toward the tire radial direction with regard to the tire cross-sectional height H is preferably 0.10 to 0.25. By disposing the step in this manner, mud and the like on a road surface is reliably contacted up to the step when traveling on muddy ground or the like, and therefore, an effect based on the step can be sufficiently demonstrated.

Note that in the present technology, the tire ground contact end is an end portion when the tire is mounted to a regular rim and 60% of a regular load is applied by placing orthogonally on a plane in a condition where 230 kPa of air pressure is filled. "Regular rim" is a rim defined by a standard for each tire according to a system of standards that includes standards on which tires are based, and refers to a "standard rim" in the case of Japan Automobile Tyre Manufacturers Association (JATMA), refers to a "design rim" in the case of Tire and Rim Association (TRA), and refers to a "measuring rim" in the case of European Tyre and Rim Technical Organisation (ETRTO). "Regular load" is a load defined by a standard for each tire according to a system of standards that includes standards on which tires are based, and refers to a "maximum load capacity" for JATMA, to a maximum value in the table of "TIRE ROAD LIMITS AT VARIOUS COLD INFLATION PRESSURES" in the case of TRA, and to "LOAD CAPACITY" for ETRTO.

DETAILED DESCRIPTION

A configuration of the present technology will be described in detail below while referring to that attached drawings.

Figure 1:
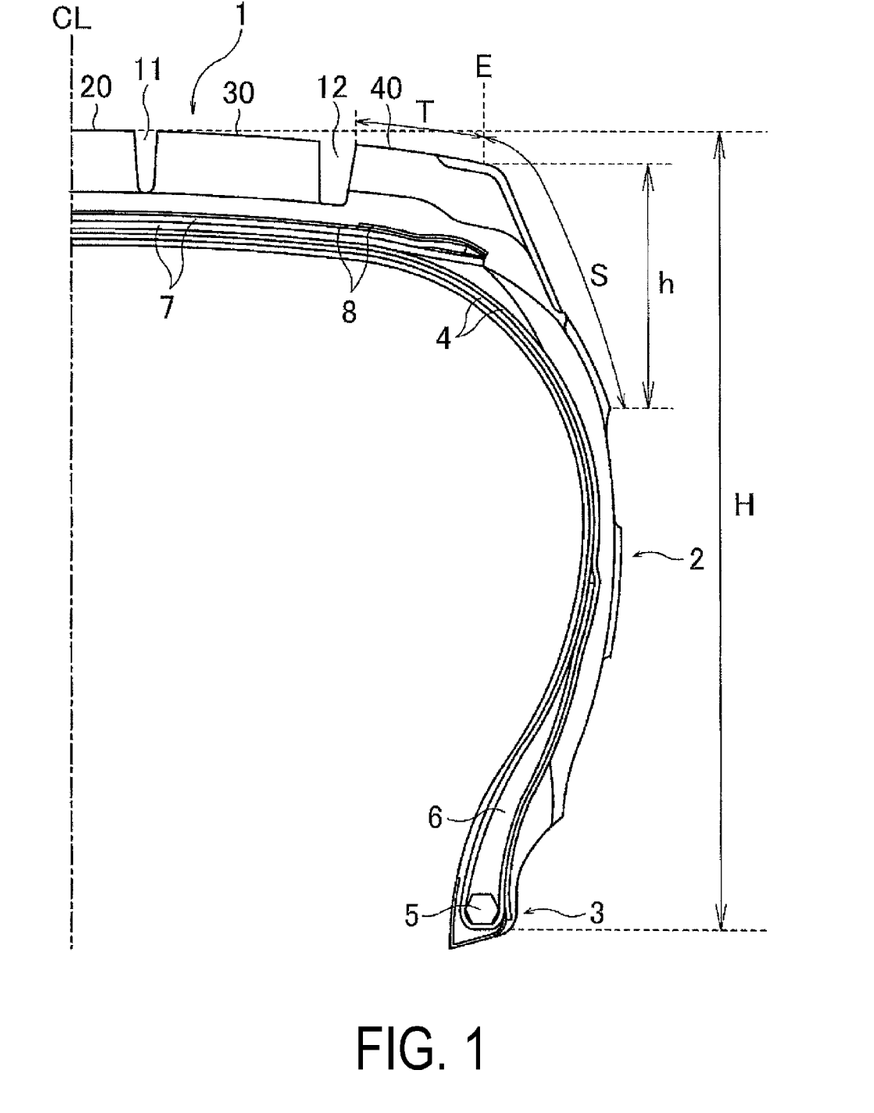
FIG. 1 is a meridian cross-sectional view of a pneumatic tire according to an embodiment of the present technology.

In FIG. 1, reference sign CL in denotes a tire equator. The pneumatic tire of the present technology is configured from an annular-shaped tread portion 1 extending in a tire circumferential direction, a pair of sidewall portions 2 disposed on both sides of the tread portion 1, and a pair of bead portions 3 disposed on an inner side in a tire radial direction of the sidewall portions 2. Note that in FIG. 1, only a first side with regard to the tire equator CL is illustrated, but a second side with regard to the tire equator also has the same cross-sectional structure.

A two-layered carcass layer 4 is mounted between the left and right pair of bead portions 3. Carcass layers 4 include a plurality of reinforcing cords extending in the tire radial direction. A carcass layer 4 positioned on an inner circumferential side of on the tread portion 1 is folded back from a vehicle inner side to an outer side around a bead core 5 positioned on the bead portions 3. A carcass layer 4 positioned on an outer circumferential side on the tread portion 1 is such that an end portion thereof is disposed on an outer side in a tire width direction of a folded back portion of the carcass layer 4 on the inner circumferential side. Furthermore, a bead filler 6 is disposed on an outer circumference of the bead core 5, and the bead filler 6 is wrapped by a main body portion and the folded back portion of the carcass layer 4 on the inner circumferential side. On the other hand, a plurality (two in FIG. 1) of belt layers 7 are embedded on the outer circumferential side of the carcass layer 4 on the tread portion 1. The belt layers 7 includes a plurality of reinforcing cords inclined with regard to the tire circumferential direction, and are disposed such that the reinforcing cords mutually intersect between the layers. In the belt layers 7, an inclination angle of the reinforcing cords with regard to the tire circumferential direction is set within a range of 10° to 40° for example. A belt reinforcing layer 8 (two layers including a layer covering an entire width of the belt layer 7 and layer covering only an end portion in the tire width direction of the belt layer 7) is further provided on an outer circumferential side of the belt layer 7. The belt reinforcing layer 8 includes an organic fiber cord oriented in the tire circumferential direction. In the belt reinforcing layer 8, an angle of the organic fiber cord with regard to the tire circumferential direction is set 0° to 5° for example.

The present technology may be applied to this general pneumatic tire, but a cross-sectional structure thereof is not limited to the basic structure described above.

Figure 2:
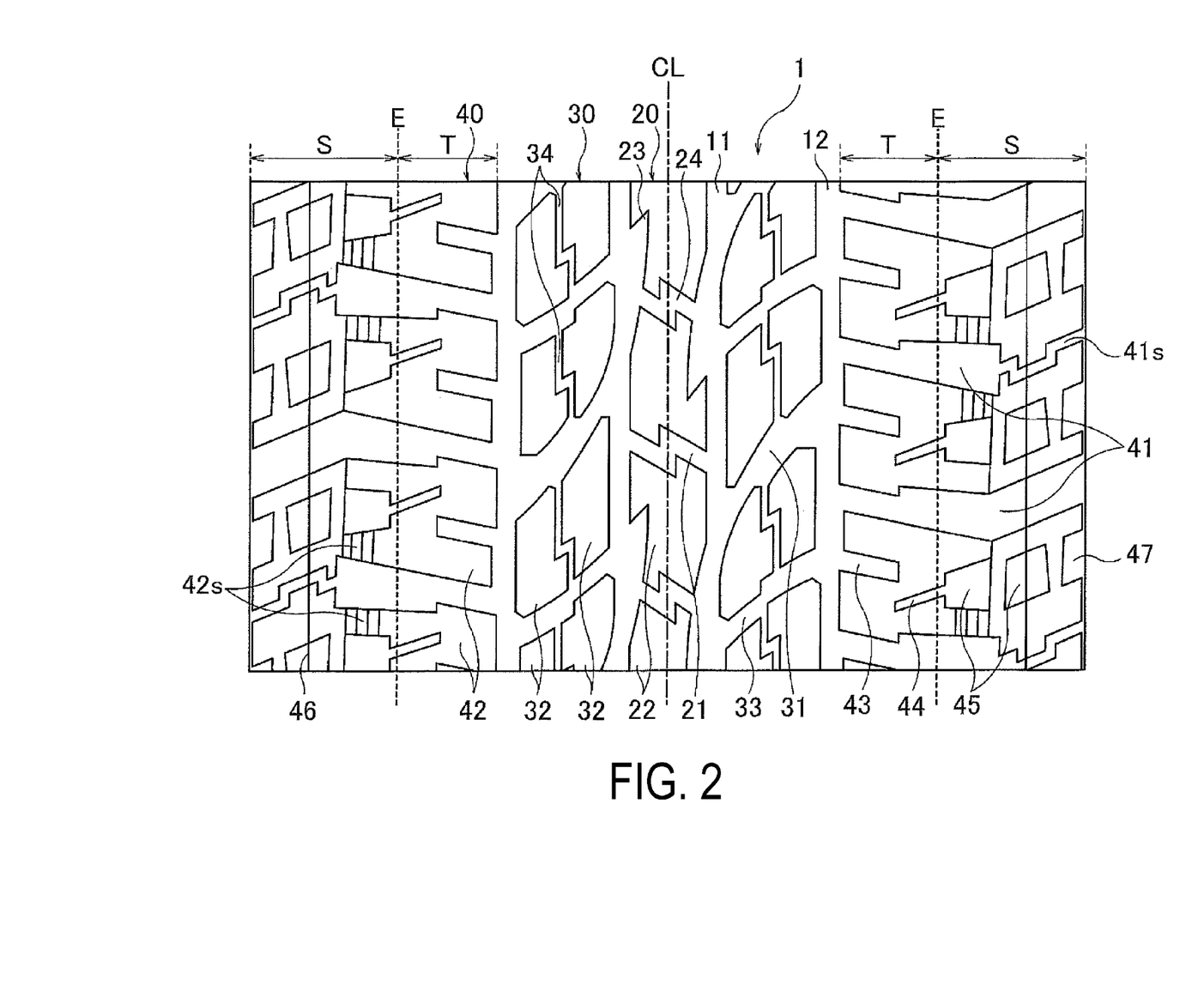
FIG. 2 is a front surface view illustrating a tread surface of the pneumatic tire according to the embodiment of the present technology.

Four main grooves extending in the tire circumferential direction are formed on the tread portion 1 in the embodiment illustrated in FIGS. 1 and 2. Of the four main grooves, main grooves disposed on a tire equator CL side on both sides in the tire width direction of the tire equator CL are inner main grooves 11, and main grooves disposed on an outer side (shoulder portion side) in the tire width direction of the inner main groove 11 are outer main grooves 12.

Five land portions extending in the tire circumferential direction are demarcated on the tread portion 1 by the four main grooves 11, 12. Of the five land portions, a land portion demarcated between two of the inner main grooves 11 is a central land portion 20, a land portion demarcated between the inner main groove 11 and outer main groove 12 is a middle land portion 30, and a land portion demarcated on the outer side in the tire width direction of the outer main groove 12 is a shoulder land portion 40.

A plurality of central lug grooves 21 that connect to the inner main groove 11 on both sides are provided on the central land portion 20 at intervals in the tire circumferential direction. The central lug grooves 21 have a zigzag shape and are configured from a portion extending in the tire circumferential direction, a portion extending from a first end to the main groove on a first side in the tire width direction, and a portion extending from a second end to the main groove on a second side in the tire width direction. At this time, the portion extending in the tire circumferential direction of the central lug grooves 21 positioned on the tire equator CL. Furthermore, the two portions extending in the tire width direction on the central lug grooves 21 are inclined in the same direction with regard to the tire width direction, and inclination angles of the portions are the same.

The central land portion 20 is divided into a plurality of central blocks 22 arranged in the tire circumferential direction by the central lug groove 21. A notch portion 23 with a shape notched into a V shape toward the tire equator CL is formed on a wall surface (wall surface facing the inner main groove 11) on both sides in the tire width direction of the central blocks 22. Chamfering can be performed on a portion connecting the wall surface of the notch portions 23 and surface of the central blocks 22. A central auxiliary groove 24 connecting the notch portions 23 is formed between two notch portions 23 formed on one central block 22. The central auxiliary groove 24 open opens on a middle portion of the wall surface leading to an apex of the V-shaped notch portion 23. Furthermore, the central auxiliary grooves 24 have the same bent shape as the central lug groove lug groove 21, and inclined in the same direction as the central lug groove 21. However, the central auxiliary grooves 24 have smaller groove widths than the central lug groove 21.

Note that a plurality of sipes (not illustrated in the drawings) extending in the tire width direction can be provided on the portions of the central blocks 22 divided by the central auxiliary groove 24. A sipe having a zigzag shape can be used on a surface of the central blocks 22 for example.

A plurality of middle lug grooves 31 extending in the tire width direction are provided on the middle land portion 30 at intervals in the tire circumferential direction. The middle lug grooves 31 are inclined with regard to the tire width direction, and curved in an arc shape forming a protrusion on the tire equator CL side. Note that a groove width of the middle lug grooves 31 are not necessarily constant, and the groove width may change in steps as illustrated in the drawings.

The middle land portion 30 is divided into a plurality of middle blocks 32 arranged in the tire circumferential direction by the middle lug groove 31. The middle blocks 32 are further demarcated by a middle auxiliary groove 33 extending in the tire width direction and a circumferential direction auxiliary groove 34 extending in the tire circumferential direction. The middle auxiliary groove 33 has a groove width that changes at a central portion in a width direction of the middle block 32, and has a wide width portion and a narrow width portion. The circumferential direction auxiliary groove 34 has a zigzag shape and is connected to the middle lug groove 31 and wide width portion of the middle auxiliary groove 33. A wall surface facing a main groove of the components of the middle block 32 divided by the middle auxiliary groove 33 and circumferential direction auxiliary groove 34 is offset in the tire width direction for each component, and is configured such that recesses and protrusions repeat when viewing the groove wall surface on the middle land portion 30 of the main grooves in the tire circumferential direction.

At least one sipe (not illustrated in the drawings) can be provided on the portions of the middle block 32 divided by the middle auxiliary groove 33 and circumferential direction auxiliary groove 34. A sipe having a zigzag shape can be used on a surface of the block for example.

Note that in the illustrated example, the V-shaped notch portion 23 formed on the central land portion 20 is configured so as to match an acute angle portion formed when connecting an extension line of the middle lug groove 31 provided on the middle land portion 30 and an extension line of the middle auxiliary groove 33.

A plurality of shoulder lug grooves 41 extending in the tire width direction are provided on the shoulder land portions 40 at intervals in the tire circumferential direction. The shoulder lug groove 41 extends from the outer main groove 12 toward the outer side in the tire width direction and reaches the sidewall portion 2. The shoulder lug groove 41 has a groove width that gradually increases toward the outer side in the tire width direction. Note that in the illustrated example, one portion with a step-wise increasing groove width is present in each shoulder lug groove 41 in a region (ground contact region) more to the inner side in the tire width direction than the ground contact end E.

The shoulder land portion is divided into a plurality of shoulder blocks 42 arranged in the tire circumferential direction based on the plurality of shoulder lug grooves 41. Two types of shoulder auxiliary grooves (first shoulder auxiliary groove 43 and second shoulder auxiliary groove 44) extending in the tire width direction are formed on the shoulder blocks 42. The first shoulder auxiliary groove 43 has a shape where a first end that connects to the outer main groove 12, and a second end that closes inside the shoulder block 42. The second shoulder auxiliary groove 44 has a shape where a first end is closed inside the shoulder block 42, and a second end that extends past the ground contact end E. A groove wall surface facing the outer main groove 12 of a portion of the shoulder block 42 divided by the first shoulder auxiliary groove 43 is offset in the tire width direction.

If closing positions of the first shoulder auxiliary groove 43 and second shoulder auxiliary groove 44 inside the shoulder block 42 are aligned in the tire width direction as with the illustrated example, a sipe (not illustrated in the drawings) extending in a straight line in the tire circumferential direction can be provided such that the closing ends are connected. Furthermore, a sipe (not illustrated in the drawings) extending from the closing end of the first shoulder auxiliary groove 43 along an extension direction of the first shoulder auxiliary groove 43, or a sipe (not illustrated in the drawings) extending from the closing end of the second shoulder auxiliary groove 44 along an extension direction of the second shoulder auxiliary groove 44 can be provided on the shoulder block 42.

In the illustrated example, when the lug grooves (central lug groove 21, middle lug groove 31, and shoulder lug groove 41) are formed on the land portions (central land portion 20 middle land portion 30, shoulder land portion 40) as described above. the inclination directions of the lug grooves (central lug groove 21, middle lug groove 31, and shoulder lug groove 41) formed on adjacent land portions are configured to be facing opposite directions.

A structure of the tread pattern illustrated in FIG. 2 was described above, but the present technology primarily defines a structure of a region (side region S) more on the outer side in the tire width direction than the ground contact end E as described later, and therefore, so long as at least the shoulder block 42 is demarcated by the outer main groove 12 as described above, the structure of another portion in a ground contact region is not necessarily limited to the embodiment in FIG. 2.

Figure 3:
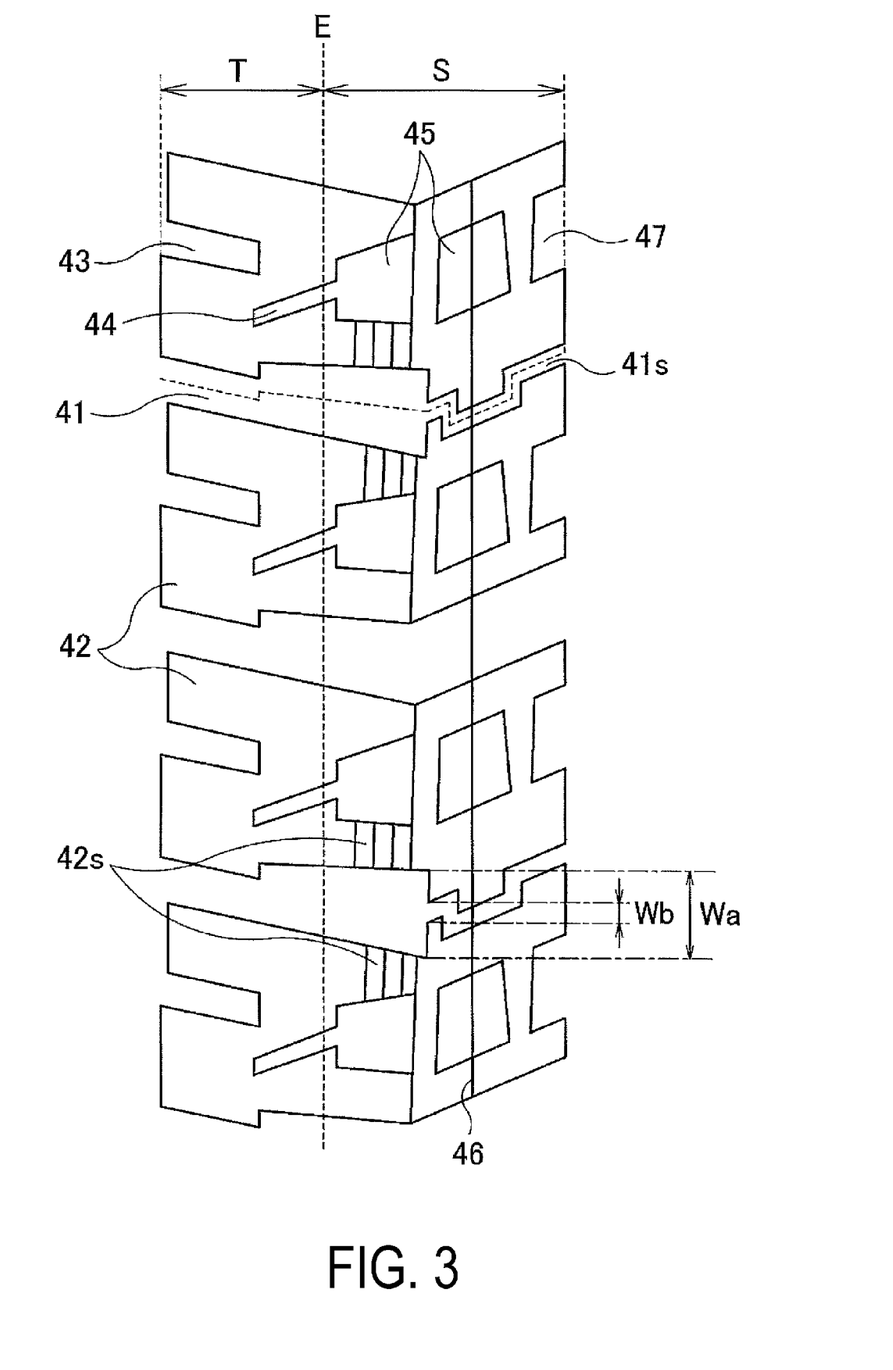
FIG. 3 is a front surface view enlarging a shoulder portion of the pneumatic tire of the present technology.
Figure 4:
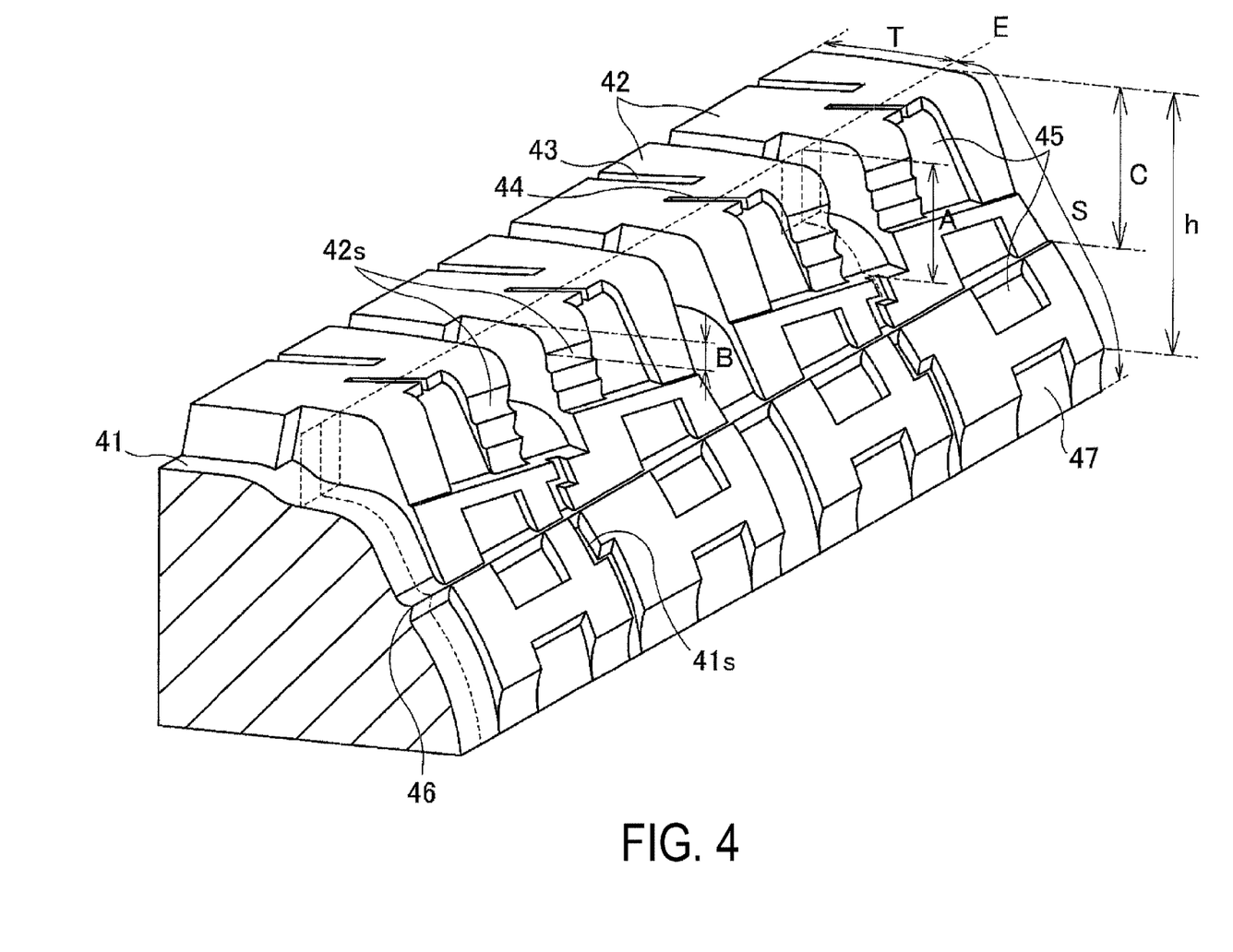
FIG. 4 is a perspective view enlarging the shoulder portion of the pneumatic tire of the present technology.

In the present technology, as enlarged in FIGS. 3 and 4, the shoulder block 42 extends past the ground contact end E, and when an orthogonal distance to an edge on the innermost side in the tire radial direction of the shoulder block 42 measured from the ground contact end E position of the tread portion 1 toward the tire radial direction is set as h, a ratio h/H of the orthogonal distance h with regard to a tire cross-sectional height H is set to 0.2 or higher. At this time, the shoulder block 42 does not extend past a tire maximum width position, and the edge on the innermost side in the tire radial direction of the shoulder block 42 is positioned more on the outer side in the radial direction than the tire maximum width position. The ratio h/H of the orthogonal distance h with regard to the tire cross-sectional height H is preferably set to 0.32 to 0.40.

With the shoulder block 42 widely formed to the inner side in the tire radial direction in this manner, when a more inner side in the tire width direction than the ground contact end E is set as tread side region T, and the outer side in the tire width direction is set as the side region S, a plurality of recessed portions 45 each having a closed periphery are formed in the side region S. Note that the first shoulder auxiliary groove 43 and second shoulder auxiliary groove 44 can be formed in the tread side region T. In the examples in FIGS. 2 to 4, two of the recessed portions 45 are disposed in line in the tire radial direction in the side region S. In this example, the second shoulder auxiliary groove 44 is connected to the recessed portion 45 on the outer side in the tire radial direction (ground contact end E side), but the second auxiliary groove 44 has a groove width and groove depth that is sufficiently smaller than the lug groove (shoulder lug groove 41), and therefore, the recessed portion 45 can be deemed to have a periphery that is substantially closed.

The plurality of recessed portion 45 having a closed periphery is provided in the side region S of the shoulder block 42 in this manner, and therefore, when traveling on deep muddy ground or the like, mud and the like can be grabbed and compacted by the recessed portions 45. As a result, excellent traction properties can be ensured based on a shear force with regard to the compacted mud or the like. At this time, the shoulder block 42 widely extends to the inner side in the tire radial direction, and the plurality of recessed portions 45 are formed more on the outer side than the ground contact end E, and therefore, when the tire enters deep muddy ground or the like, the tire can widely use a portion contacting mud and the like to enhance traction properties.

At this time, when the ratio h/H of the orthogonal distance h with regard to the tire cross-sectional height H is lower than 0.2, a portion where the tire contacts mud and the like cannot be widely used when the tire enters deep muddy ground or the like, and thus sufficiently enhancing traction properties is difficult. Conversely, even if the shoulder block 42 extends past the tire maximum width position, a portion more on the inner side in the tire radial direction than the tire maximum width position does not contact mud and the like even if the tire enters deep muddy ground or the like, and therefore, an effect of improving traction properties is not achieved. Furthermore, the shoulder block 42 is present over a wide range of the sidewall portion 2, and a rubber thickness of the sidewall portion 2 increases, and therefore, another adverse effect may occur on tire performance.

In the shoulder blocks 42, the plurality of recessed portions 45 are formed such that ratio Sin/Sout of a total area Sin of the plurality of recessed portions 45 for each of the shoulder blocks 42 and area Sout of the side region for each of the shoulder blocks satisfies a relationship of 0.2≤Sin/Sout≤0.6. Thereby, even if the recessed portion 45 is provided, the rigidity of the shoulder block 42 can be sufficiently ensured, and traction properties based on the recessed portions 45 can be effectively demonstrated while maintaining block rigidity. Herein, when the ratio Sin/Sout is lower than 0.2. the volume of the recessed portions 45 is insufficient, and an effect of improving traction properties based on providing the recessed portions 45 is not achieved. When the Sin/Sout is higher than 0.6, the rigidity of the shoulder block 42 is insufficient, and therefore, traction properties instead deteriorate. The ratio Sin/Sout is preferably set to 0.25 to 0.35.

So long as the recessed portions 45 grab and compact mud and the like as described above, the shape of the block surface is not particularly limited. For example, in addition to a square shape (trapezoidal shape) illustrated in FIGS. 2 to 4, a triangular shape, circular shape, and the like can be used. Note that as with the illustrated square shape, when a linear portion (edge portion) intersecting with regard to the tire circumferential direction is provided, mud and the like can be scraped by the linear portion thereof, which is advantageous in enhancing running performance on muddy ground and the like.

In the illustrated example, the plurality of recessed portions 45 are disposed in line with the tire radial direction, but the plurality of recessed portions 45 can be disposed in line with the tire circumferential direction. However, as illustrated in the drawings, when the plurality of recessed portions 45 are disposed in line with the tire radial direction, a circumferential length of the recessed portions 45 (in other words, circumferential length of mud or the like compacted by the recessed portions 45) can be ensured, and thus traction properties can be more effectively enhanced.

The recessed portions 45 preferably have a depth of 0.5 mm or more. Furthermore, the depth of the recessed portions 45 is preferably shallower than the groove depth of a portion of the shoulder lug groove 41 adjacent in the circumferential direction with regard to the recessed portions 45. Thereby, the rigidity of the shoulder block 42 is not reduced, and the volume of the recessed portion 45 can be sufficiently ensured, which is advantageous in achieving traction properties based on a shear force with regard to the compacted mud and the like. At this time, when the depth of the recessed portions 45 is less than 0.5 mm, the volume of the recessed portions 45 cannot be sufficiently ensured, and an effect of enhancing traction properties is not sufficiently achieved by the recessed portions 45. When the groove depth of the recessed portions 45 is deeper than the groove depth of the portion of the shoulder lug groove 41 adjacent in the circumferential direction, the rigidity of the shoulder block 42 is reduced, and traction properties are rather difficult to achieve. The depth of the recessed portions 45 is preferably 10% to 80% of the groove depth of the portion of the shoulder lug groove 41 adjacent in the circumferential direction with regard to the recessed portions 45.

In the present technology, when the tire enters deep muddy ground or the like, the tire is intended to widely use a portion contacting mud or the like, and therefore, sufficient recesses and protrusions are preferably present in a region separated from the tread portion 1. Therefore, a maximum protruding amount of the shoulder block 42 from a groove bottom of the shoulder lug groove 41 is preferably 1.5 mm or more on an inner side in the tire radial direction than a center position in the tire radial direction of the side region S. The shoulder block 42 is configured in this manner, and therefore, the shoulder block 42 sufficiently protrudes even in a region separated to the inner side in the tire radial direction from the tread portion 1, which is advantageous in enhancing traction performance. At this time, when the maximum protruding amount is less than 1.5 mm, recesses and protrusions of a region separated to the inner side in the tire radial direction from the tread portion 1 (protruding amount of the shoulder block 42) is insufficient, and thus the tire widely using a portion contacting mud and the like is difficult when the tire enters deep muddy ground or the like, and traction properties are difficult to effectively enhance.

In the present technology, as enlarged in FIGS. 3 and 4, the shoulder lug groove 41 of at least a portion is preferably provided with a narrow width bent portion 41s on an end portion on the outer side in the tire width direction. The narrow width bent portion 41s has a shape bent toward an extension direction of the shoulder lug groove 41 in conjunction with a groove width that is smaller than another portion of the shoulder lug groove 41 having the narrow width bent portion 41s. In particular, in the embodiment illustrated in FIGS. 3 and 4, the narrow width bent portion 41s is configured from a portion extending to an outer side in the tire and connecting to another portion of the shoulder lug groove 41, a portion extending to a first side in the tire circumferential direction from one end thereof, a portion extending to the outer side in the tire width direction from one end thereof, a portion extending to a second side in the tire circumferential direction from one end thereof, and a portion extending to the outer side in the tire width direction from one end thereof. In other words, a middle portion on a wall surface on a first side of the portion of the shoulder block 42 adjacent to both sides of the narrow width bent portion 41s protrudes toward the inside of the narrow width bent portion 41s, and corresponding thereto, a middle portion on a wall surface on a second side recessed toward an inner side of the shoulder block 42, and therefore, a bent shape of the narrow width bent portion 41s is formed. If the narrow width bent portion 41s is provided, discharging of mud and the like in the shoulder lug groove 41 having the narrow width bent portion 41s to the outer side in the tire width direction can be suppressed, and the mud and the like in the shoulder lug groove 41 can be compacted in the groove, and thus excellent traction properties can be ensured based on a shear force with regard to the compacted mug or the like, even in the shoulder lug groove 41.

In particular, when the narrow width bent portion 41s has a bent shape as illustrated in the drawings, mud and the like are easily grabbed by a folded portion having a bent shape, which is advantageous in improving traction properties.

At this time, when a groove width of the shoulder lug groove 41 at an initial position of the narrow width bent portion 41s when viewing the shoulder lug groove 41 having the narrow width bent portion 41s from the tire equator CL side to the outer side in the tire width direction (in other words, maximum groove width of a portion where the groove width is not narrowed by the narrow width bent portion 41s in the shoulder lug groove 41 having the narrow width bent portion 41) is set as Wa, and a groove width in the narrow width bent portion 41s is set as Wb, the ratio Wb/Wa of the groove widths is preferably within a range of 0.15 to 0.50. By setting the groove width of the narrow width bent portion 41s in this manner, discharging performance of mud and the like based on the narrow width bent portion 41s and traction properties based on a shear force with regard to compacted mud and the like can both be established with favorable balance. When the ratio Wb/Wa is lower than 0.15, the shoulder lug groove 41 is essentially closed, and therefore, the discharging performance of mud and the like is reduced. When the ratio Wb/Wa is higher than 0.50, discharging of mud and the like cannot be sufficiently suppressed, and traction performance is not sufficiently achieved based on a shear force with regard to the compacted mud and the like. Note that in the illustrated example, the narrow width bent portion 41s has the aforementioned bent shape, but the aforementioned groove width ratio is preferably satisfied at all sites thereof.

The narrow width bent portion 41s is provided on an end portion on the outer side in the tire width direction of the shoulder lug groove 41, but is preferably provided such that the ratio AH of the orthogonal distance A from the ground contact end E position of the tread portion 1 to the narrow width bent portion 41s measured toward the tire radial direction is 0.05 to 0.3. By disposing the narrow width bent portion 41s in this manner, when traveling on muddy ground or the like (and particularly deep muddy ground or the like), mud and the like on a road surface is reliably contacted up to the narrow width bent portion and not only a portion up to the ground contact end E of the shoulder lug groove 41 when traveling on muddy ground or the like, and therefore, an effect based on a narrow width bent portion 50 can be favorably demonstrated.

In particular, if the plurality of recessed portions 45 are disposed in line in the tire radial direction, a recessed portion 45 on at least the innermost side in the tire radial direction is preferably adjacent in the circumferential direction with the narrow width bent portion 41S. By disposing the recessed portion 45 and narrow width bent portion 41s in this manner, a complex recess and protrusion based on the recessed portion 45 and narrow width bent portion 41s is formed in a region separated from the tread portion 1, which is advantageous in enhancing traction properties.

If the narrow width bent portion 41s is provided on the shoulder lug groove 41 in at least a portion, the aforementioned effect can be achieved. Furthermore, the narrow width bent portion 41a can be provided in all of the shoulder lug grooves 41. As illustrated in the drawings, a shoulder lug groove 41 having the narrow width bent portion 41s and a shoulder lug groove not having the narrow width bent portion 41s are preferably alternatingly disposed along the tire circumferential direction. Thereby, a shoulder lug groove 41 (not having the narrow width bent portion 41s) with excellent discharging performance of mud and the like due to having a sufficient groove width to an end portion on the outer side in the tire circumferential direction, and a shoulder lug groove 41 (having the narrow width bent portion 41s) with slightly inferior discharging performance of mud and the like, but with excellent traction properties based on a shear force with regard to compacted mud and the like can be uniformly disposed in the tire circumferential direction, both of these performances can be established with favorable balance, and tire performance can be effectively demonstrated to match the conditions when traveling.

If the narrow width bent portion 41s is provided, a stepwise protruding and recessed portion 42s rising along a surface of the shoulder blocks 42 on a portion of the shoulder blocks 42 positioned on both sides in the tire circumferential direction of the shoulder lug groove 41 having the narrow width bent portion 41s is preferably provided. By providing the protruding and recessed portion 42s in this manner, mud and the like packed in the shoulder lug groove 41 can be effectively discharged through the protruding and recessed portion 42s when normally traveling, and the discharging performance of the mud and the like can be improved. Furthermore, when traveling on deep muddy ground or the like, mud and the like can be engaged by the protruding and recessed portion 42s, which is advantageous in enhancing traction properties.

Figure 5:
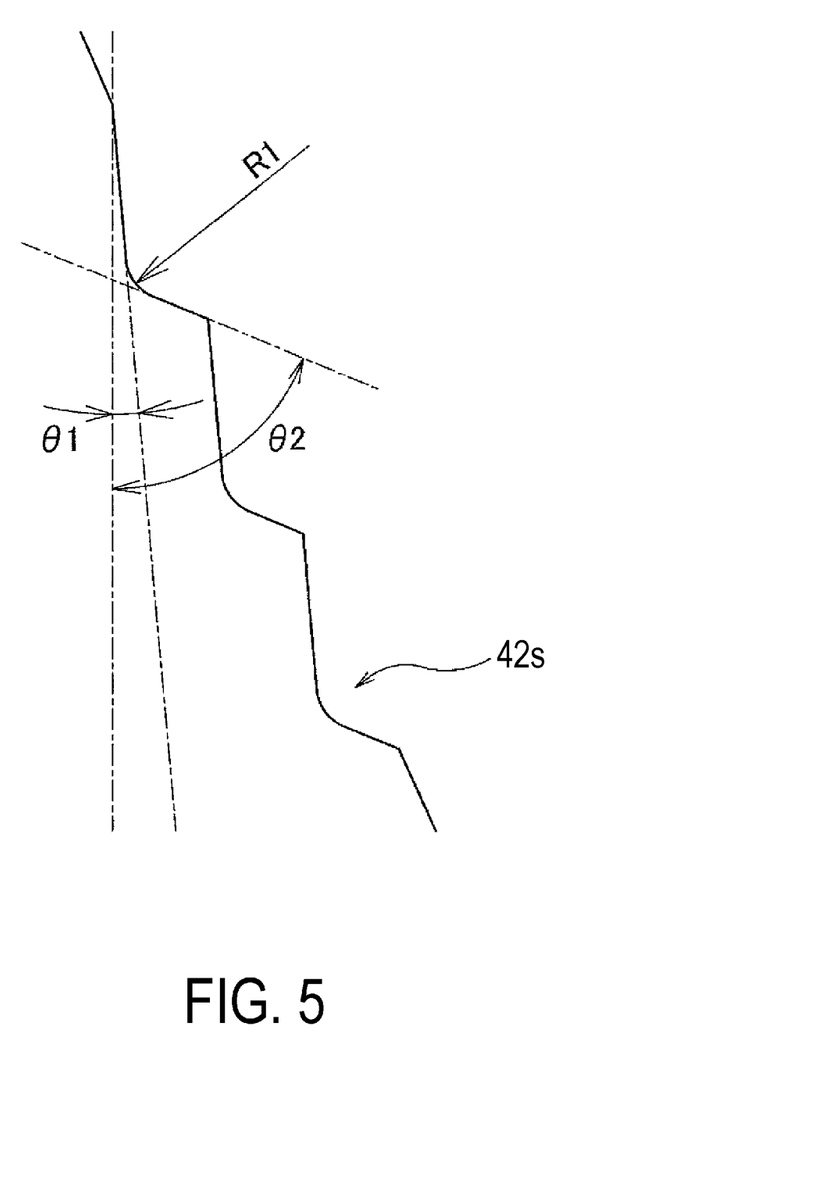
FIG. 5 is a meridian cross-sectional view describing a shape of a stepwise protruding and recessed portion.

As enlarged in FIG. 5, the protruding and recessed portion 42s is preferably configured by two inclined surfaces, namely, a surface extending in an essentially tire radial direction and a surface extending in an essentially tire width direction on a meridian cross section repeating in an alternating manner. When an inclination angle of one of the two inclined surfaces with regard to the tire radial direction is set as θ1, and the inclination angle of the other with regard to the tire radial direction is set as θ2, the inclination angles θ1 and θ2 preferably have a relationship of θ1<θ2. At this time, the inclination angle θ1 is preferably set to 5° to 30°, and the inclination angle θ2 is preferably set to 65° to 85°. Furthermore, the two inclined surfaces may be connected by a smooth arc on the meridian cross section, and a radius of curvature R1 of the arc may be set to 2 mm to 5 mm.

In the shoulder lug groove 41 having the narrow width bent portion 41s, the protruding and recessed portion 42s is preferably provided on a portion of the shoulder blocks 42 on both sides of a portion in front of the narrow width bent portion 41s (in other words, a vicinity of a portion with the largest groove width of the shoulder lug grooves 41) when viewing the shoulder lug groove 41 from the tire equator CL to the outer side in the tire width direction, so as to be adjacent to the shoulder lug groove 41. Disposing the protruding and recessed portion 42s in a vicinity of a site with the largest groove width of the shoulder lug grooves 41 is advantageous in discharging mud and the like packed in the shoulder lug groove 41 during normal travel.

A ratio B/H of an orthogonal distance B from a ground contact end E position of the tread portion 1 to the protruding and recessed portion 42s measured toward the tire radial direction with regard to a tire cross-sectional height H is more preferably set with a range of 0.01 to 0.1. Note that a position of the protruding and recessed portion 42s in an outermost side in the tire width direction is preferably more to the inner side than an end portion on a tire equator side of the narrow width bent portion 41s, and therefore, the ratio of an orthogonal distance from the ground contact end E position of the tread portion 1 to the outermost side in the tire width direction of the protruding and recessed portion 42s measured toward the tire radial direction with regard to the tire cross-sectional height H is set within essentially the same range as the aforementioned ratio A/H.

In the illustrated example, a step formed by the protruding and recessed portion 42s extending along the tire circumferential direction across the entire circumference of the tire is furthermore provided, and the narrow width bent portion 41s and recessed portion 45 on the innermost side in the tire radial direction are divided in the tire radial direction by the step. Specifically, a block surface more on the outer side in the tire radial direction than the step protrudes more to the outer side in the tire width direction than a block surface more on the tread portion 1 side than the step. Furthermore, inside the shoulder lug groove 41, inside the narrow width bent portion 41s, and inside the recessed portion 45 have an essentially triangular cross-sectional-shaped protrusion, and an apex of the protrusion matches an edge of the step on a block surface more on the outer side in the tire radial direction than the step. By providing the step formed by the protruding and recessed portion 42s in this manner, a complex protruding and recessed shape can be formed in a region separated from the tread portion 1, and mud and the like are easily engaged, which is advantageous in enhancing traction properties.

If the step formed by the protruding and recessed portion 42s is provided in this manner, a ratio C/H of an orthogonal distance C from a ground contact end E position of the tread portion 1 to the step measured toward the tire radial direction is preferably 0.10 to 0.25. By disposing the step in this manner, mud and the like on a road surface is reliably contacted up to the step when traveling on muddy ground or the like, and therefore, an effect based on the step can be sufficiently demonstrated.

In the illustrated drawings, a recessed portion 47 recessed to the tire equator CL side on an end surface on the inner side in the tire radial direction of the shoulder block 42 is formed in addition to the recessed portion 45 having a closed periphery. The recessed portion 47 opens toward the inner side in the tire radial direction and a periphery is not closed. If the recessed portion 47 having a non-closed periphery is provided on the end surface on the inner side in the tire radial direction of the shoulder block 42 in this manner, edges of the shoulder block 42 will increase, and therefore, mud and the like is easily grabbed which is advantageous in enhancing traction properties.

In the aforementioned description, an effect of the present technology was described using mud performance when traveling on muddy ground as an example, but on snowy roads, running performance on a snow-covered road surface (snow performance) can be achieved by demonstrating a similar function with regard to snow on a road surface in place of mud on muddy ground.

Examples 34 types of pneumatic tires of Conventional Example 1, Comparative Examples 1 to 3, and Examples 1 to 30 were prepared, having a tire size of 265/65 R 17 112H, having the basic structure illustrated in FIG. 1, having the structure illustrated in FIG. 2 for a tread pattern within the ground contact region, and for a structure more on the outer side in the tire width direction than the ground contact end, the following were set as shown in Tables 1 to 3: the number of the recessed portions each having a closed periphery, formed in the side region of the shoulder block; the placement of the recessed portions; ratio h/H of the orthogonal distance h from the ground contact end position to the edge on the innermost side in the tire radial direction measured toward the tire radiation direction with regard to the tire cross-sectional height H; the ratio Sin/Sout of the total area Sin of the recessed portions for each of the shoulder blocks and area Sout of the side region for each of the blocks; the maximum protrusion amount from a bottom surface of the lug groove of the shoulder block more on the inner side in the tire radial direction than a center portion in the tire radial direction of the side region; depth of the recessed portions; the presence or absence of the narrow width bent portion; the placement of the narrow width bent portion; ratio Wb/Wa of the groove width Wa of the lug groove at the initial position of the narrow width bent portion when viewing the lug groove having the narrow width bent portion from the tire equator side and the groove width Wb in the narrow width bent portion; ratio A/H of the orthogonal distance A from the ground contact end position of the tread portion to the narrow width bent portion measured toward the tire radial direction with regard to the tire cross-sectional height H; presence of absence of the stepwise protruding and recessed portion; ratio B/H of the orthogonal distance B from the ground contact end position of the tread portion to the stepwise protruding and recessed portion measured toward the tire radial direction; presence or absence of a step extending across the entire circumference of the tire along the tire circumferential direction such that the recessed portion on the innermost side in the tire radial direction and narrow width bent portion are divided; and ratio C/H of the orthogonal distance C from the ground contact end position of the tread portion to the step measured toward the tire radial direction with regard to the tire cross-sectional height H.

Note that the shape of the recessed portions was set to a square shape as illustrated in FIGS. 3 and 4 for all examples having the recessed portions. Furthermore, the "depth of recessed portions" in the examples was measured at a position in the tire radial direction where the shoulder block protruded most from the bottom surface of the lug groove (position in the tire radial direction where the maximum protruding amount was measured) more on the inner side in the tire radial direction than the center position in the tire radial direction of the side region. In other words, Example 15 is an example where the depth of the recessed portions matches the maximum protruding amount (in other words, depth of the shoulder lug groove in the position thereof).

In the examples having the protruding and recessed portion, the shape of the protruding and recessed portion was set to the shape illustrated in FIG. 5, the inclination angle θ1 of the two inclined surfaces configuring the protruding and recessed portion was set to 5°, and inclination angle θ2 was set to 80°, and the radius of curvature R1 of the arc connecting the inclined surfaces was common at 2 mm. On the other hand, in Example 25 not having the protruding and recessed portion, a surface of a portion of the shoulder blocks positioned on both sides in the tire circumferential direction of the shoulder lug groove having the narrow width bent portion was as smooth as a surface of a portion of the shoulder blocks positioned on both sides in the tire circumferential direction of the shoulder lug grooves not having the narrow width bent portion.

For the column "Placement of recessed portions" in Tables 1 to 3, a case where the plurality of recessed portions are disposed in line with the tire radial direction was described as "radial direction", and a case where the plurality of recessed portions disposed in line with the tire circumferential direction was described as "circumferential direction". Furthermore, for the column "Placement of narrow width bent portion" in Tables 1 to 3, a case where the shoulder lug grooves having the narrow width bent portion and the shoulder lug grooves not having the narrow width bent portion are alternatingly disposed along the tire circumferential direction is described as "alternating", a case where the shoulder lug grooves having the narrow width bent portion are randomly disposed in only one portion, and a portion where the shoulder lug grooves not having the are adjacent to each other is included is described as "portion", and a case where all of the shoulder lug grooves have the narrow width bent portion is described as "all grooves".

For the 34 types of pneumatic tires, the mud feeling and the startability on a deep muddy road surface were evaluated based on the following evaluating methods, and the results thereof are collectively shown in Tables 1 to 3.

Mud Feel

The test tires were mounted to a wheel with a 17×8J rim size, the air pressure was set to 230 kPa, the wheel was mounted to a 4-wheel drive car with a 3.5 L engine displacement, a test run was performed by a test driver on a mud course (mud depth: 10 mm to 20 mm), and the running performance (mud feel) at this time was sensory evaluated. Evaluation results are expressed as indexes with Conventional Example 1 set as 100. Larger index values indicate excellent mud feel.

Startability on Deep Muddy Road Surface

The test tires were mounted to a wheel with a 17×8J rim size, the air pressure was set to 230 kPa, the wheel was mounted to a 4-wheel drive car with a 3.5 L engine displacement, a test run was performed by a test driver on a deep muddy road surface (mud depth: 100 mm to 200 mm), and the startability at this time was sensory evaluated. Evaluation results are expressed as indexes with Conventional Example 1 set as 100. Larger indexes indicate excellent startability on a deep muddy road surface.

TABLE 1

| | | Conventional Example 1 | Comparative Example 1 | Example 1 | Example 2 | Example 3 |
|---|---|---|---|---|---|---|
| Ratio h/H | | 0.15 | 0.35 | 0.35 | 0.35 | 0.35 |
| Maximum protruding amount | mm | 1.0 | 3.0 | 3.0 | 3.0 | 3.0 |
| Number of recessed portions | | 0 | 1 | 2 | 3 | 2 |
| Placement of recessed portions | | — | — | Radial direction | Radial direction | Circumferential direction |
| Ratio Sin/Sout | | — | 0.3 | 0.3 | 0.3 | 0.3 |
| Depth of recessed portions | mm | — | 2.0 | 2.0 | 2.0 | 2.0 |
| Presence of narrow width bent portion | | Yes | Yes | Yes | Yes | Yes |
| Placement of narrow width bent portion | | Alternating | Alternating | Alternating | Alternating | Alternating |
| Ratio Wb/Wa | | 0.4 | 0.4 | 0.4 | 0.4 | 0.4 |
| Ratio A/H | | 0.15 | 0.15 | 0.15 | 0.15 | 0.15 |
| Presence of protruding and recessed portion | | Yes | Yes | Yes | Yes | Yes |
| Ratio B/H | | 0.05 | 0.05 | 0.05 | 0.05 | 0.05 |
| Presence of step | | Yes | Yes | Yes | Yes | Yes |
| Ratio C/H | | 0.18 | 0.18 | 0.18 | 0.18 | 0.18 |
| Mud feel | index | 100 | 101 | 105 | 105 | 103 |
| Startability | index | 100 | 98 | 105 | 105 | 103 |

| | | Comparative Example 2 | Example 4 | Example 5 | Example 6 | Example 7 | Example 8 |
|---|---|---|---|---|---|---|---|
| Ratio h/H | | 0.20 | 0.25 | 0.4 | 0.35 | 0.35 | 0.35 |
| Maximum protruding amount | mm | 3.0 | 3.0 | 3.0 | 1.0 | 1.5 | 4.0 |
| Number of recessed portions | | 2 | 2 | 2 | 2 | 2 | 2 |
| Placement of recessed portions | | Radial direction | Radial direction | Radial direction | Radial direction | Radial direction | Radial direction |
| Ratio Sin/Sout | | 0.3 | 0.3 | 0.3 | 0.3 | 0.3 | 0.3 |
| Depth of recessed portions | mm | 2.0 | 2.0 | 2.0 | 2.0 | 2.0 | 2.0 |
| Presence of narrow width bent portion | | Yes | Yes | Yes | Yes | Yes | Yes |
| Placement of narrow width bent portion | | Alternating | Alternating | Alternating | Alternating | Alternating | Alternating |
| Ratio Wb/Wa | | 0.4 | 0.4 | 0.4 | 0.4 | 0.4 | 0.4 |
| Ratio A/H | | 0.15 | 0.15 | 0.15 | 0.15 | 0.15 | 0.15 |
| Presence of protruding and recessed portion | | Yes | Yes | Yes | Yes | Yes | Yes |
| Ratio B/H | | 0.05 | 0.05 | 0.05 | 0.05 | 0.05 | 0.05 |
| Presence of step | | Yes | Yes | Yes | Yes | Yes | Yes |
| Ratio C/H | | 0.18 | 0.18 | 0.18 | 0.18 | 0.18 | 0.18 |
| Mud feel | index | 101 | 102 | 105 | 101 | 102 | 105 |
| Startability | index | 98 | 101 | 105 | 101 | 102 | 105 |

TABLE 2

|  |  | Comparative Example 3 | Example 9 | Example 10 | Example 11 | Example 12 |
|---|---|---|---|---|---|---|
| Ratio h/H |  | 0.35 | 0.35 | 0.35 | 0.35 | 0.35 |
| Maximum protruding amount | mm | 3.0 | 3.0 | 3.0 | 3.0 | 3.0 |
| Number of recessed portions |  | 2 | 2 | 2 | 2 | 2 |
| Placement of recessed portions |  | Radial direction | Radial direction | Radial direction | Radial direction | Radial direction |
| Ratio Sin/Sout |  | 0.15 | 0.2 | 0.4 | 0.6 | 0.3 |
| Depth of recessed portions | mm | 2.0 | 2.0 | 2.0 | 2.0 | 0.3 |
| Presence of narrow width bent portion |  | Yes | Yes | Yes | Yes | Yes |
| Placement of narrow width bent portion |  | Alternating | Alternating | Alternating | Alternating | Alternating |
| Ratio Wb/Wa |  | 0.4 | 0.4 | 0.4 | 0.4 | 0.4 |
| Ratio A/H |  | 0.15 | 0.15 | 0.15 | 0.15 | 0.15 |
| Presence of protruding and recessed portion |  | Yes | Yes | Yes | Yes | Yes |
| Ratio B/H |  | 0.05 | 0.05 | 0.05 | 0.05 | 0.05 |
| Presence of step |  | Yes | Yes | Yes | Yes | Yes |
| Ratio C/H |  | 0.18 | 0.18 | 0.18 | 0.18 | 0.18 |
| Mud feel | index | 100 | 102 | 105 | 105 | 102 |
| Startability | index | 100 | 103 | 102 | 101 | 101 |

|  |  | Example 13 | Example 14 | Example 15 | Example 16 | Example 17 | Example 18 |
|---|---|---|---|---|---|---|---|
| Ratio h/H |  | 0.35 | 0.35 | 0.35 | 0.35 | 0.35 | 0.35 |
| Maximum protruding amount | mm | 3.0 | 3.0 | 3.0 | 3.0 | 3.0 | 3.0 |
| Number of recessed portions |  | 2 | 2 | 2 | 2 | 2 | 2 |
| Placement of recessed portions |  | Radial direction | Radial direction | Radial direction | Radial direction | Radial direction | Radial direction |
| Ratio Sin/Sout |  | 0.3 | 0.3 | 0.3 | 0.3 | 0.3 | 0.3 |
| Depth of recessed portions | mm | 0.5 | 2.4 | 3.0 | 2.0 | 2.0 | 2.0 |
| Presence of narrow width bent portion |  | Yes | Yes | Yes | No | Yes | Yes |
| Placement of narrow width bent portion |  | Alternating | Alternating | Alternating | — | Portion | All grooves |
| Ratio Wb/Wa |  | 0.4 | 0.4 | 0.4 | — | 0.4 | 0.4 |
| Ratio A/H |  | 0.15 | 0.15 | 0.15 | — | 0.15 | 0.15 |
| Presence of protruding and recessed portion |  | Yes | Yes | Yes | Yes | Yes | Yes |
| Ratio B/H |  | 0.05 | 0.05 | 0.05 | 0.05 | 0.05 | 0.05 |
| Presence of step |  | Yes | Yes | Yes | Yes | Yes | Yes |
| Ratio C/H |  | 0.18 | 0.18 | 0.18 | 0.18 | 0.18 | 0.18 |
| Mud feel | index | 104 | 105 | 105 | 101 | 103 | 102 |
| Startability | index | 103 | 103 | 101 | 101 | 103 | 105 |

TABLE 3

|  |  | Example 19 | Example 20 | Example 21 | Example 22 | Example 23 | Example 24 |
|---|---|---|---|---|---|---|---|
| Ratio h/H |  | 0.35 | 0.35 | 0.35 | 0.35 | 0.35 | 0.35 |
| Maximum protruding amount | mm | 3.0 | 3.0 | 3.0 | 3.0 | 3.0 | 3.0 |
| Number of recessed portions |  | 2 | 2 | 2 | 2 | 2 | 2 |
| Placement of recessed portions |  | Radial direction | Radial direction | Radial direction | Radial direction | Radial direction | Radial direction |
| Ratio Sin/Sout |  | 0.3 | 0.3 | 0.3 | 0.3 | 0.3 | 0.3 |
| Depth of recessed portions | mm | 2.0 | 2.0 | 2.0 | 2.0 | 2.0 | 2.0 |

TABLE 3-continued

|  |  |  |  |  |  |  |
|---|---|---|---|---|---|---|
| Presence of narrow width bent portion | Yes | Yes | Yes | Yes | Yes | Yes |
| Placement of narrow width bent portion | Alternating | Alternating | Alternating | Alternating | Alternating | Alternating |
| Ratio Wb/Wa | 0.1 | 0.15 | 0.5 | 0.55 | 0.4 | 0.4 |
| Ratio A/H | 0.15 | 0.15 | 0.15 | 0.15 | 0.02 | 0.4 |
| Presence of protruding and recessed portion | Yes | Yes | Yes | Yes | Yes | Yes |
| Ratio B/H | 0.05 | 0.05 | 0.05 | 0.05 | 0.05 | 0.05 |
| Presence of step | Yes | Yes | Yes | Yes | Yes | Yes |
| Ratio C/H | 0.18 | 0.18 | 0.18 | 0.18 | 0.18 | 0.18 |
| Mud feel index | 101 | 103 | 105 | 105 | 103 | 103 |
| Startability index | 105 | 105 | 103 | 101 | 103 | 103 |

|  |  | Example 25 | Example 26 | Example 27 | Example 28 | Example 29 | Example 30 |
|---|---|---|---|---|---|---|---|
| Ratio h/H |  | 0.35 | 0.35 | 0.35 | 0.35 | 0.35 | 0.35 |
| Maximum protruding amount | mm | 3.0 | 3.0 | 3.0 | 3.0 | 3.0 | 3.0 |
| Number of recessed portions |  | 2 | 2 | 2 | 2 | 2 | 2 |
| Placement of recessed portions |  | Radial direction | Radial direction | Radial direction | Radial direction | Radial direction | Radial direction |
| Ratio Sin/Sout |  | 0.3 | 0.3 | 0.3 | 0.3 | 0.3 | 0.3 |
| Depth of recessed portions | mm | 2.0 | 2.0 | 2.0 | 2.0 | 2.0 | 2.0 |
| Presence of narrow width bent portion |  | Yes | Yes | Yes | Yes | Yes | Yes |
| Placement of narrow width bent portion |  | Alternating | Alternating | Alternating | Alternating | Alternating | Alternating |
| Ratio Wb/Wa |  | 0.4 | 0.4 | 0.4 | 0.4 | 0.4 | 0.4 |
| Ratio A/H |  | 0.15 | 0.15 | 0.15 | 0.15 | 0.15 | 0.15 |
| Presence of protruding and recessed portion |  | No | Yes | Yes | Yes | Yes | Yes |
| Ratio B/H |  | — | 0.005 | 0.15 | 0.05 | 0.05 | 0.05 |
| Presence of step |  | Yes | Yes | Yes | No | Yes | Yes |
| Ratio C/H |  | 0.18 | 0.18 | 0.18 | — | 0.05 | 0.3 |
| Mud feel | index | 101 | 103 | 103 | 101 | 103 | 103 |
| Startability | index | 101 | 103 | 103 | 101 | 103 | 103 |

As seen from Tables 1 to 3, Examples 1 to 30 all had improved mud feel and startability on a deep muddy road surface as compared to Conventional Example 1. On the other hand, Comparative Example 1 was provided with only one recessed portion in the side region of the shoulder blocks, and therefore, the recessed portion was relatively large, block rigidity was not maintained, and startability on a deep muddy road surface deteriorated. In Comparative Example 2, the ratio h/H was low, the shoulder block did not sufficiently widely extend in the tire radial direction, and a recessed portion was provided on the shoulder block, and therefore, the block rigidity was not ensured, and the startability on a deep muddy road surface could not be improved. In the Comparative Example 3, ratio Sin/Sout is low, and the volume of the recessed portion could not be sufficiently ensured, and therefore, the mud feel and startability on a deep muddy road surface could not be improved.

The invention claimed is:

1. A pneumatic tire, comprising:
an annular-shaped tread portion extending in a tire circumferential direction;
a pair of sidewall portions disposed on both sides of the tread portion;
a pair of bead portions disposed on an inner side in a tire radial direction of the sidewall portions;
a main groove extending in the tire circumferential direction disposed on a shoulder region of the tread portion;
a plurality of lug grooves extending from the main groove toward an outer side of a tire width direction and reaching a respective sidewall portion of the sidewall portions; and
a plurality of blocks being demarcated by the main groove and the plurality of lug grooves; wherein
for the plurality of blocks, an edge on an innermost side in the tire radial direction is positioned more on an outer side in the tire radial direction than a tire maximum width position, and a ratio h/H of an orthogonal distance h from a ground contact end position of the tread portion to the edge on the innermost side in the tire radial direction measured toward the tire radial direction with regard to a tire cross-sectional height H is 0.2 or more; the plurality of blocks are provided with a plurality of recessed portions each having a closed periphery in a side region more on the outer side of the tire width direction than the ground contact end position of the tread portion; and a ratio of Sin/Sout of a total area Sin of the plurality of recessed portions for each of the plurality of blocks and an area Sout of the side region for each of the plurality of blocks satisfies a relationship of 0.2≤Sin/Sout≤0.6; and of the plurality of lug grooves, at least a portion of the plurality of lug grooves includes a narrow width bent portion bent with regard to an extending direction of the plurality of lug grooves in conjunction with having a smaller groove width than another portion of the plurality of lug grooves.

2. The pneumatic tire according to claim 1, wherein a maximum protruding amount of the plurality of blocks from groove bottoms of the plurality of lug grooves is 1.5 mm or more on the inner side in the tire radial direction than a center position in the tire radial direction of the side region.

3. The pneumatic tire according to claim 1, wherein a depth of the plurality of recessed portions is 0.5 mm or more, and shallower than a groove depth of a portion of the plurality of lug grooves adjacent in the tire circumferential direction with regard to the plurality of recessed portions.

4. The pneumatic tire according to claim 1, wherein a lug groove having the narrow width bent portion and a lug groove not having the narrow width bent portion are alternatingly disposed along the tire circumferential direction.

5. The pneumatic tire according to claim 1, wherein a ratio Wb/Wa of a groove width Wa of each lug groove of the plurality of lug grooves at an initial position of the narrow width bent portion and a groove width Wb on the narrow width bent portion, when the portion of the plurality of lug grooves having the narrow width bent portion is viewed from a tire equator side, is 0.15 to 0.50.

6. The pneumatic tire according to claim 1, wherein a ratio A/H of an orthogonal distance A from the ground contact end position of the tread portion to the narrow width bent portion measured toward the tire radial direction with regard to the tire cross-sectional height H is 0.05 to 0.3.

7. The pneumatic tire according to claim 1, wherein a stepwise protruding and recessed portion rising along a surface of the plurality of blocks on a portion of the plurality of blocks positioned on both sides in the tire circumferential direction of the portion of the plurality of lug grooves having the narrow width bent portion is provided.

8. The pneumatic tire according to claim 7, wherein a ratio B/H of an orthogonal distance B from the ground contact end position of the tread portion to the stepwise protruding and recessed portion measured toward the tire radial direction with regard to the tire cross-sectional height H is 0.01 to 0.1.

9. The pneumatic tire according to claim 1, wherein the plurality of recessed portions are disposed in line in the tire radial direction, and at least a recessed portion on the innermost side in the tire radial direction is adjacent in the circumferential direction with the narrow width bent portion.

10. The pneumatic tire according to claim 9, comprising a step extending across an entire circumference of the tire along the tire circumferential direction such that the recessed portion on the innermost side in the tire radial direction and the narrow width bent portion are divided.

11. The pneumatic tire according to claim 10, wherein a ratio C/H of an orthogonal distance C from the ground contact end position of the tread portion to the step measured toward the tire radial direction with regard to the tire cross-sectional height H is 0.10 to 0.25.

* * * * *